United States Patent
Morrison

(10) Patent No.: US 6,809,450 B1
(45) Date of Patent: Oct. 26, 2004

(54) SOFTWARE FOR SYSTEM FOR CONTROLLING A MAGNETICALLY LEVITATED ROTOR

(75) Inventor: Carlos R. Morrison, North Ridgeville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/729,580

(22) Filed: Dec. 4, 2003

Related U.S. Application Data

(62) Division of application No. 10/390,256, filed on Mar. 12, 2003.
(60) Provisional application No. 60/364,002, filed on Mar. 14, 2002.

(51) Int. Cl.[7] .................................................. H02K 7/09
(52) U.S. Cl. .................... 310/90.5; 310/90; 310/91; 700/44; 700/42; 700/45; 318/574; 318/575; 318/806
(58) Field of Search ....................... 310/90.5, 95.5, 310/90, 91; 700/174, 42, 45, 44; 318/806, 574, 575

(56) References Cited

U.S. PATENT DOCUMENTS

| 4,245,869 A | 1/1981 | Scheffer et al. |
| 4,866,318 A | 9/1989 | Habermann et al. |
| 4,874,998 A * | 10/1989 | Hollis ................... 318/568.21 |
| 5,027,280 A | 6/1991 | Ando et al. |
| 5,355,042 A * | 10/1994 | Lewis ......................... 310/90 |
| 5,734,108 A * | 3/1998 | Walker ......................... 73/650 |
| 5,772,564 A * | 6/1998 | Taniguchi ...................... 483/7 |
| 6,078,120 A * | 6/2000 | Casaro ...................... 310/90.5 |
| 6,130,494 A * | 10/2000 | Schob ....................... 310/90.5 |
| 6,215,218 B1 * | 4/2001 | Ueyama .................... 310/90.5 |
| 6,472,787 B1 * | 10/2002 | Kameno et al. ........... 310/90.5 |
| 6,606,536 B1 * | 8/2003 | Aso ........................... 700/174 |
| 6,664,680 B1 * | 12/2003 | Gabrys ....................... 310/74 |
| 6,727,618 B1 * | 4/2004 | Morrisom .................... 310/90 |

FOREIGN PATENT DOCUMENTS

DE     003120691 A * 12/1982 .......... F16C/32/04

* cited by examiner

Primary Examiner—Dang Le
Assistant Examiner—Iraj A. Mohandesi
(74) Attorney, Agent, or Firm—Kent N. Stone

(57) ABSTRACT

In a rotor assembly having a rotor supported for rotation by magnetic bearings, a processor controlled by software or firmware controls the generation of force vectors that position the rotor relative to its bearings in a "bounce" mode in which the rotor axis is displaced from the principal axis defined between the bearings and a "tilt" mode in which the rotor axis is tilted or inclined relative to the principal axis. Waveform driven perturbations are introduced to generate force vectors that excite the rotor in either the "bounce" or "tilt" modes.

18 Claims, 11 Drawing Sheets

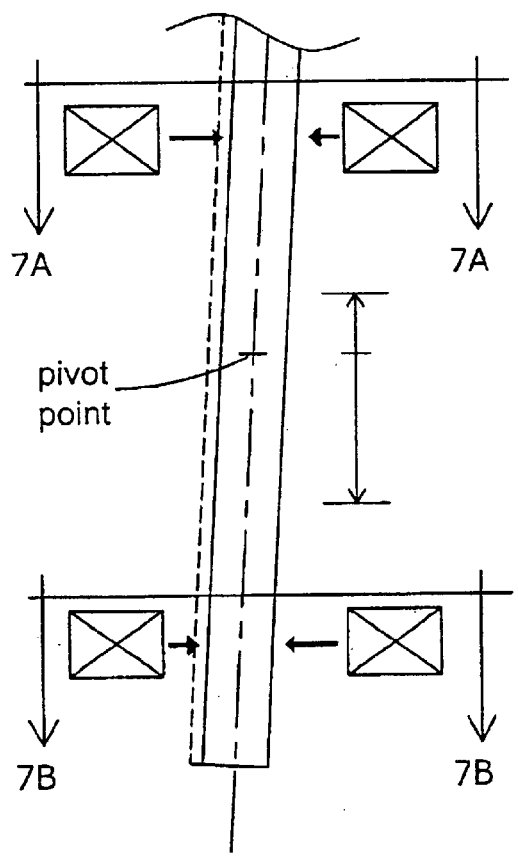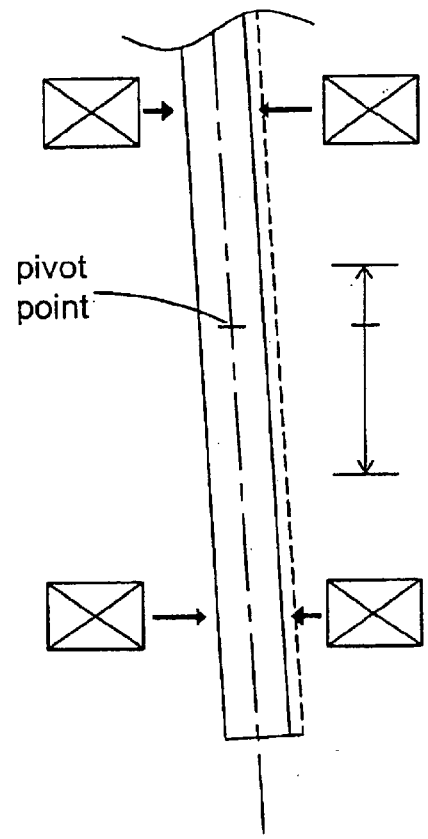
FIG. 5A                    FIG. 5B

SOFTWARE FOR SYSTEM FOR CONTROLLING A MAGNETICALLY LEVITATED ROTOR

This is a divisional of application Ser. No. 10/390,256, which was filed on Mar. 12, 2003.

This patent application claims the benefit of U.S. Provisional Patent Application No. 60/364,002 filed Mar. 14, 2002, the disclosure of which is incorporated herein by reference.

The invention described herein was made by employees of the United States Government and may be manufactured and used by or for the Government of the United States of America for governmental purposes without the payment of any royalties thereon or therefor.

BACKGROUND OF THE INVENTION

The present invention relates to a software-implemented system for controlling the movement of a magnetically supported rotor and, more particularly, to such a software-implemented system for introducing selected perturbations into the movement of the rotor.

Turbomachinery, as a class, typically includes one or more rotor or rotor assemblies mounted on a bearing-supported shaft for rotation about a primary axis. In general, the rotor is subject to radially directed stress as a consequence of shaft rotation with that stress increasing with increasing rotations per unit time.

The control of unbalance forces is extremely important as rotational speeds increase. Small asymmetries in mass distribution creates rotation-dependent vibration. The fundamental frequency of the vibration, as well as the harmonics thereof, and concomitant force vectors that rapidly change magnitude and direction with each rotation can function as an operational limit on rotational speed and, with time, reduce the operating life of the components. For example, bearing life can be substantially reduced as a consequence of prolonged vibration and, in some cases, portions of the rotating mass can be subject to fatigue failures.

Various types of test beds are known for testing rotating machinery; historically, the rotor or rotor assembly is mounted in bearings and is driven at various speeds with sensors (including vibration sensors) providing a data stream for analysis.

BRIEF SUMMARY OF THE INVENTION

In view of the above, it is an object of the present invention, among others, to provide a software-implemented system for controlling the rotation of a magnetically levitated rotor or rotor assembly such that various types of perturbations can be introduced into the rotor or rotor assembly.

It is an another object of the present invention, among others, to provide a software-implemented system for controlling the rotation of a magnetically levitated rotor or rotor assembly such that various types of perturbations can be introduced into the rotor or rotor assembly in order to obtain information as to the manner by which the rotor or rotor assembly responds to those input perturbations.

In accordance with the above objects, and others, the present invention advantageously provides a rotor assembly that is suspended for rotation in magnetic bearings to attain speeds higher than that for conventional bearings (i.e., ball bearings) and in which sufficient clearance is provided to allow magnetically-induced perturbations to cause abaxial rotation as well as nutation of the rotating components in response to software-driven processor commands.

The present invention provides for the creation of various types of perturbations via software control to investigate the performance of the rotor or rotor assembly under differing conditions.

In a preferred form of the invention, software or firmware controlled perturbations are introduced into the magnetic bearings that magnetically support a rotor for rotation and/or nutation about an axis. The rotational position of the rotor with time is determined and perturbations synchronously introduced into the magnetic bearing fields to create a "bounce" mode and/or a "tilt" mode. In the bounce mode, the magnetic force vectors that locate the rotor in its bearings are controlled to cause abaxial or off-axis rotation. In the tilt mode, the force vectors are controlled to cause a "tilted" alignment of the rotor relative to the principal axis of the bearings; the rotor is caused to nutate about a pivot point that can be positionally adjusted.

The software/firmware of the preferred embodiment may be executed on a general or specific purpose computer and includes routines therein for effecting the desired motion. Preferably, the software/firmware includes a plurality of synthesized waveforms that can be applied to the magnetic support bearings to achieve the desired motion. For example, the waveforms can be generated by executing a recurring Fourier transform routine that create sine, sine squared, cosine, cosine squared, random, square, triangular (sawtooth) and/or other waveforms.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIGS. 5A and 5B illustrate the rotor assembly of FIGS. 4A and 4B, somewhat greater detail showing the extent of the nutation of a shaft portion of the rotor assembly;

DESCRIPTION OF THE INVENTION

Figure 1:
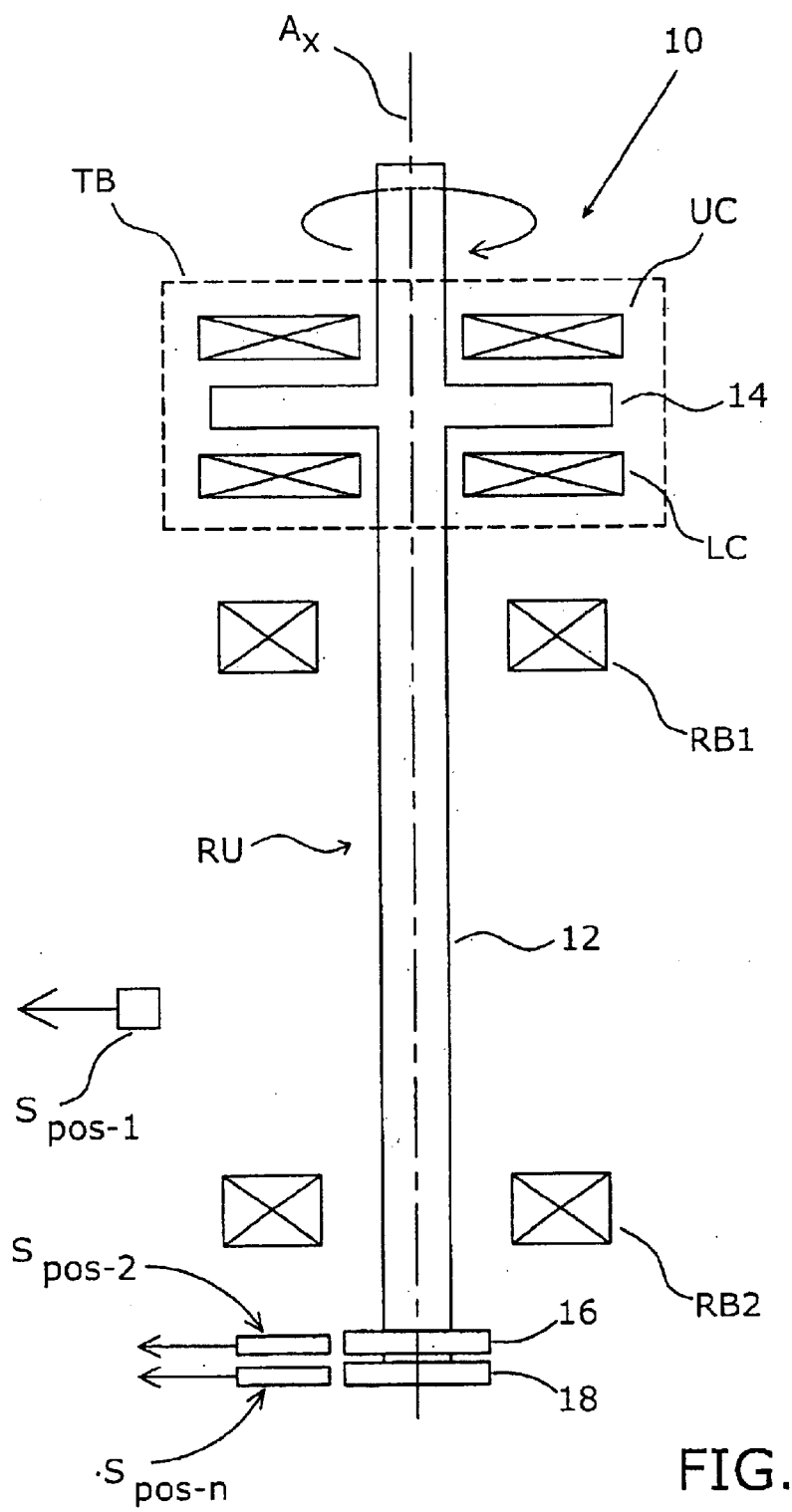
FIG. 1 illustrates a rotor assembly, in an idealized schematic form, suspended in magnetic bearings and aligned along a generally vertical axis of rotation.

The present invention is intended for use with rotor systems of the general type shown in FIG. 1 and designated therein generally by the reference character 10. As shown, the rotor system 10 includes a rotor unit RU that is generally aligned in the vertical direction. The rotor unit RU includes a generally cylindrical shaft portion 12 (having a longitudinal axis $A_x$) and a diametrically-enlarged thrust plate portion 14. Typically, the rotor unit RU is fabricated from separate piece-parts that are joined together to form an assembly, although the rotor unit RU can also be fabricated as a unitary structure.

The rotor unit RU is designed to be received by and magnetically suspended in a set of magnetic bearings that can be controlled to displace the rotor unit RU in various ways, as shown in FIG. 2 through FIG. 5B. The magnetic bearings include a thrust bearing assembly TB that includes an upper coil UC and a lower coil LC located on opposite sides of the trust plate 14 and designed, as explained below, to create an axially directed magnetic field therebetween sufficient to magnetically levitate the thrust plate 14 and its shaft 12. The shaft 12 is received by a first radial bearing RB1 adjacent the lower coil LC and a second radial bearing RB2 that is spaced from the first radial bearing RB1 and located, for example, adjacent the lower end of the rotor unit RU. The radial bearings RB1 and RB2 are coaxially aligned with each other to define a principal bearing axis (not specifically shown) therebetween. In FIG. 1, the clearances between the various bearings and the rotor unit RU have been exaggerated for reasons of clarity, the actual clearance being in the range of 0.254 mm (10 mils or 0.010") or so for a rotor unit RU having an end-to-end length in the range of 0.8 meter or so, a shaft diameter of about 7–8 cm, and a weight of about 17–20 Kg.

The rotor unit RU is designed to be rotated, for example, in the clockwise direction as shown by arrow FIG. 1, by a drive unit (not specifically shown). For example, the rotor unit RU can include a rotary coupling or selectively operated clutch unit connected to one end of the rotor unit RU and which couples the rotor unit RU to a drive unit, such as an air turbine, that will drive the rotor unit RU throughout a range of speeds (typically in the 500 rpm–40,000 rpm range). While the system is described in the context of clockwise rotation, the system is equally usable when rotated in the anti-clockwise direction.

As described below, the rotor unit RU is appropriately instrumented and can include a sensor $S_{pos-1}$ (FIG. 1) that accurately detects the rotary position of the rotor unit RU. The sensor $S_{pos-1}$ can take the form of a reflective surface on the periphery of the shaft 12 that reflects a light beam, such as a laser beam, to a photosensor which outputs an appropriate signal. In the alternative and as shown at the lower end of the shaft 12, first and second pick-off wheels 16 and 18 can be attached to the shaft 12 and a magnetic proximity detector $S_{pos-2}$ associated with the first pick-off wheel and another detector $S_{pos-2}$ associated with the second pick-off wheel. Suitable detectors include those manufactured by the Bentley-Nevada Corporation of Minden Nev. Each wheel can include one or more teeth or magnetic indentations/discontinuities so that each successive rotation of the pick-off wheels provides an appropriate output that can be processed to provide precise rotary position information and rotations per minute information.

The rotor system 10 can be used as a static or dynamic test bed for testing the rotating components used in turbomachinary. For example, turbine compressor blades can be mounted on a hub, or other test fixture, that is attached to the rotor unit RU (typically on the shaft 12 between the radial bearing RB1 and the radial bearing RB2) and then subjected to various types of stresses over time to evaluate their performance.

The rotor unit RU is designed to be operated in one of several modes including a normal mode in which the longitudinal axis $A_x$ of the rotor unit RU coincides with the principal axis defined between the two radial bearings RB1 and RB2 and at least two further operating modes, i.e., a "bounce" mode (as shown in FIGS. 2, 3A, 3B, 6A, and 6B) and a "tilt" mode (as shown in FIGS. 4A, 4B, 5A, 5B, 7A, and 7B).

Figure 2:
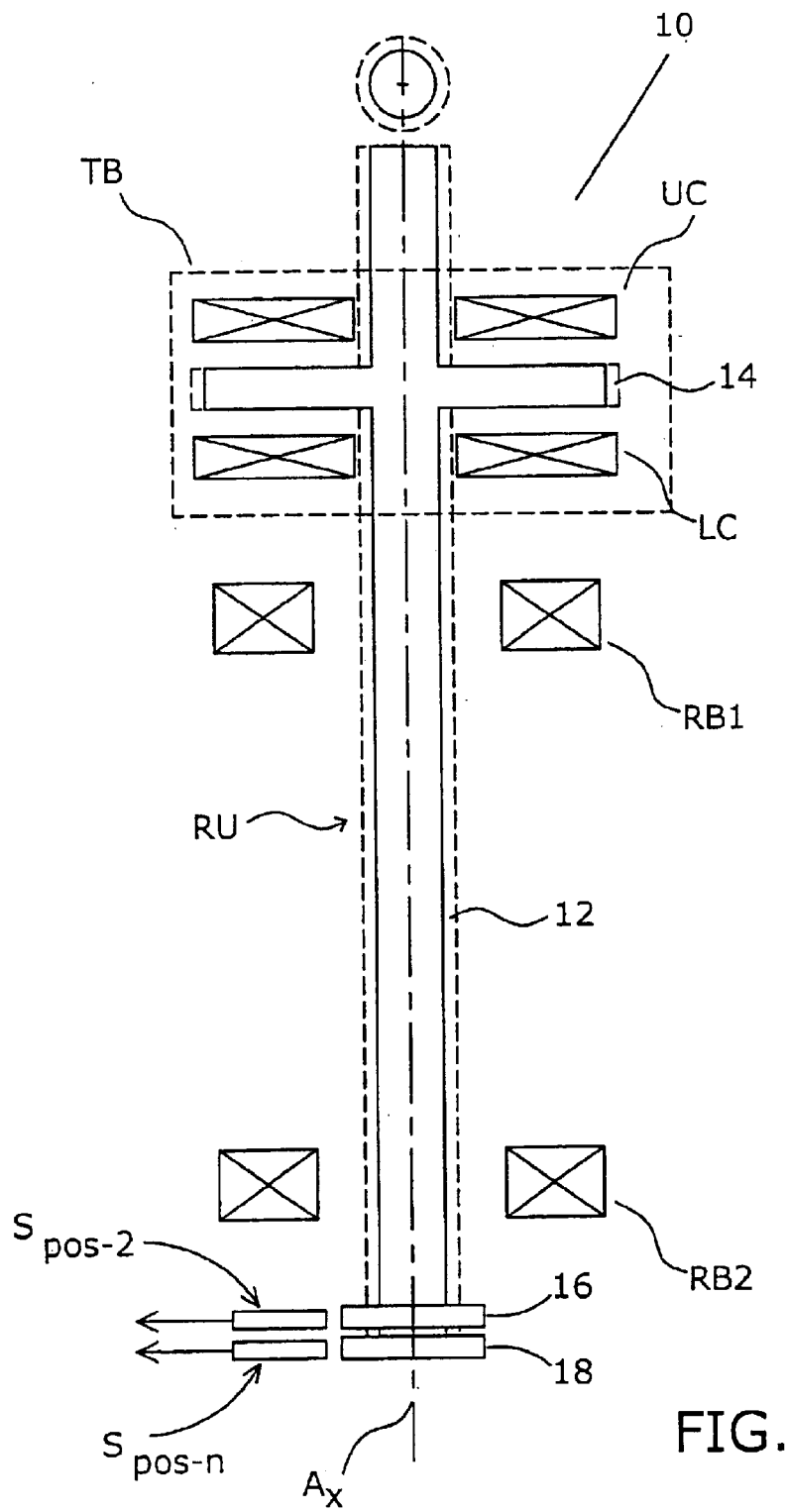
FIG. 2 illustrates the rotor assembly of FIG. 1 in which the axis of the rotor has been displaced a selected distance from the principal axis defined by the magnetic bearings, as shown in dotted-line illustration.

The rotor unit RU is nominally mounted as shown in FIG. 1, that is, the longitudinal axis $A_x$ of the rotor unit RU is co-aligned with the principal axis defined by the superposed radial bearings RB1 and RB2. As shown in FIG. 2 and explained below, the radially directed magnetic fields generated by the radial bearings RB1 and RB2 are controlled to displace the longitudinal axis $A_x$ of the rotor unit RU away from the principal bearing axis defined by the radial bearings RB1 and RB2 to establish the "bounce" mode.

Figures 3A, 3B:
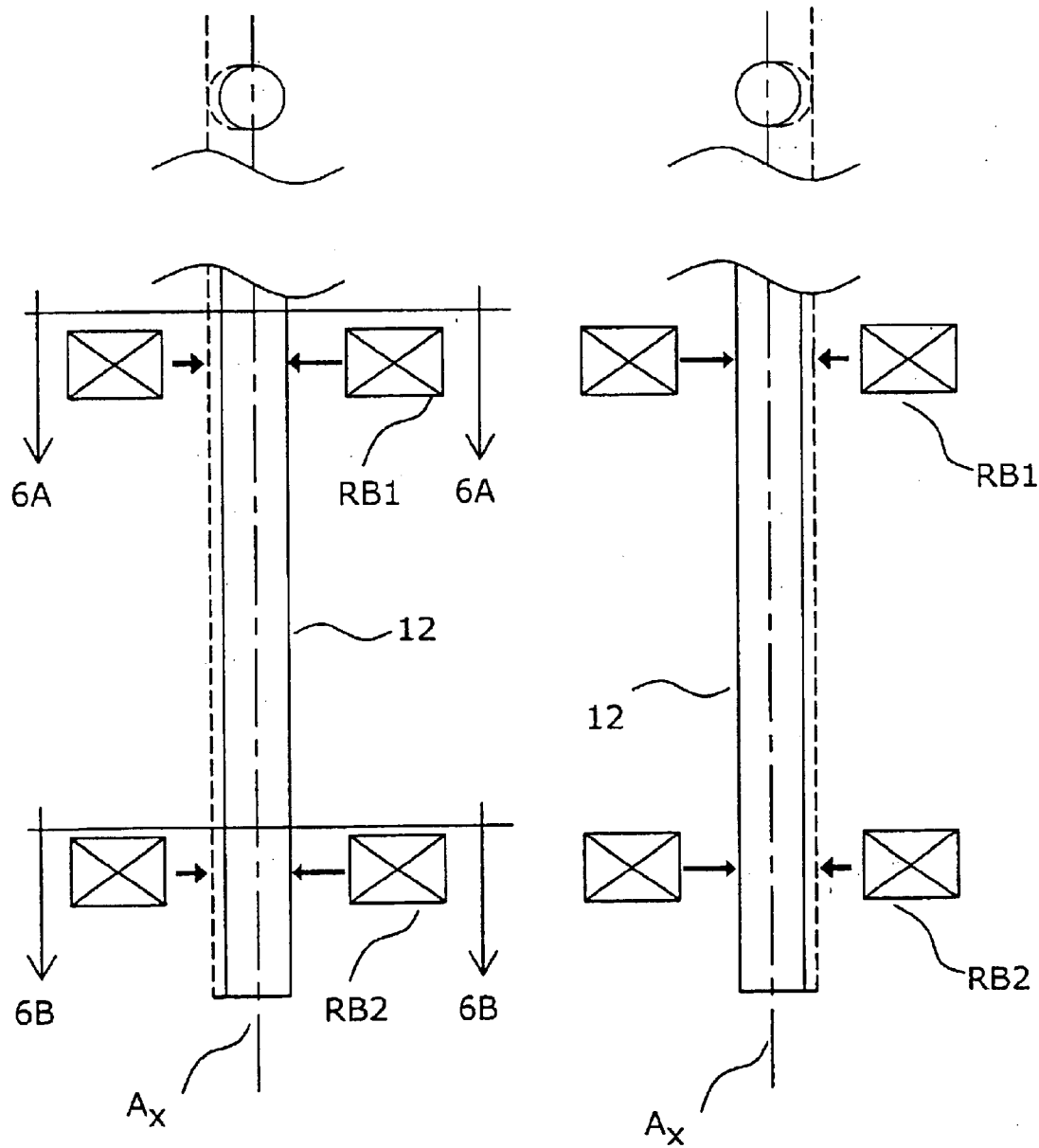
FIGS. 3A and 3B illustrate the rotor assembly of FIG. 2, in somewhat greater detail, showing the side-to-side excursion of a shaft portion of the rotor assembly.

FIGS. 3A and 3B illustrate the manner by which the radial bearings RB1 and RB2 direct magnetically generated force vectors to create the desired displacement of the rotor unit RU in the "bounce" mode. In FIG. 3A and in those figures showing force vectors, the force vector is a force of attraction generated by magnet coil(s) (shown in symbolic form in FIG. 8, for example) in the radial bearing on the side of the shaft 12 opposite from the side on which the force vector is shown. For example and in the case of the upper radial bearing RB1 shown in FIG. 3A, the longer leftward pointing force vector on the right side of the shaft 12 is generated in the radial bearing in a coil structure on the left side of the shaft 12 and the shorter rightward pointing force vector on the left-side of the shaft 12 is generated in the radial bearing in a coil structure on the right side of the shaft.

As shown in FIG. 3A, the rotor unit RU is displaced to the left when both radial bearings RB1 and RB2 generate opposing diametrically aligned magnetic force vectors in which the vectors pulling the rotor unit RU to the left have a magnitude greater than those pulling the rotor to the right. Conversely, the rotor unit RU is displaced to the right when both radial bearings RB1 and RB2 generate opposing diametrically aligned magnetic vectors in which the vectors pulling the rotor unit RU to the right have a magnitude greater than those pulling the rotor unit to the left. As can be appreciated, the ratio of the force vectors can be varied to control the magnitude of the off-set or displacement of the longitudinal axis $A_x$ of the rotor unit RU from the principal axis defined between the radial bearings RB1 and RB2. As can be appreciated, the resultant force vectors for both the radial bearings RB1 and RB2 must be substantially equal in the "bounce" mode to maintain the longitudinal axis substantially parallel to the principal axis. When the displaced rotor unit RU and its force vectors are rotated about the principal axis defined between the radial bearings RB1 and RB2, its longitudinal axis $A_x$ functions as a generatrix circumscribing a cylindrical body of revolution; an end view of the displaced rotor is represented by the dotted-line circle above the rotor unit RU in FIG. 2.

Figure 4A:
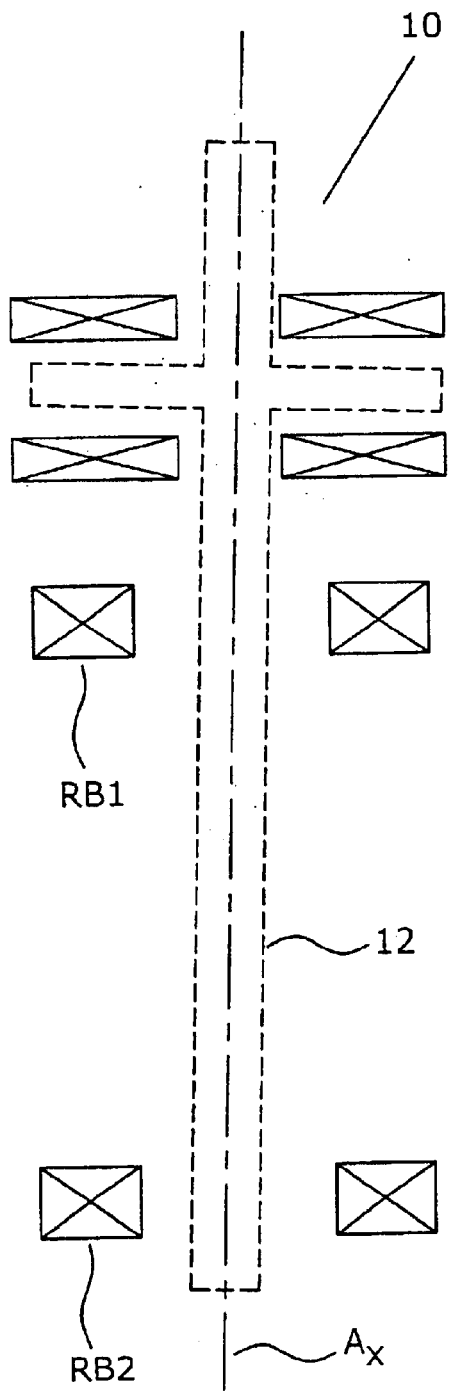
FIGS. 4A and 4B illustrate the rotor assembly of FIG. 1 in which the axis of the rotor has been tilted relative the principal axis defined between the bearings to cause the rotor assembly to nutate about the principal axis in response to engagement of a "one-per-revolution" feature, as illustrated in dotted-line illustration.
Figure 4B:
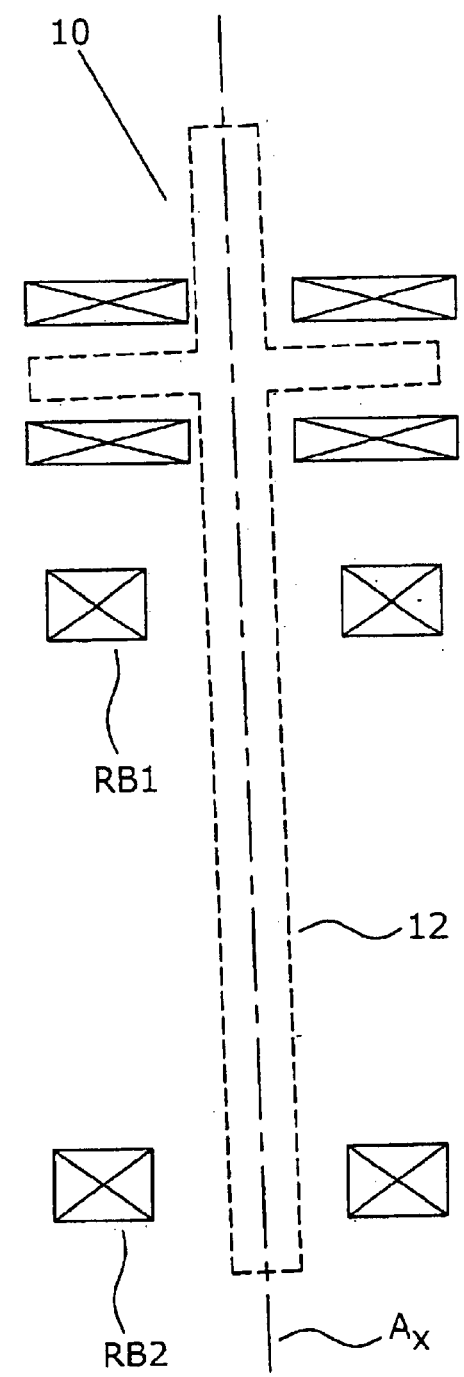

FIGS. 4A and 4B illustrate, in a general manner, the "tilt" mode. As shown in FIG. 4A, the magnetically generated force vectors generated by the upper radial bearing RB1 are controlled to displace the longitudinal axis $A_x$ of the rotor unit RU toward the right of the principal bearing axis defined by the radial bearings RB1 and RB2, and the magnetically generated force vectors generated by the lower radial bearing RB1 are controlled to displace the longitudinal axis Ax of the rotor unit RU toward the left of the principal bearing axis defined by the radial bearings RB1 and RB2. As a consequence, the rotor unit RU is "tilted" to the right as shown. As shown in FIG. 4B, when the force vectors are the opposite that shown in FIG. 4A, the rotor unit RU will be "tilted" to the left.

FIGS. 5A and 5B illustrate the manner by which the radial bearings RB1 and RB2 direct magnetically generated force vectors of different forces to create the desired displacement of the rotor unit RU. As shown in FIG. 5A, the upper portion of the rotor unit RU is displaced to the right when the radial bearing RB1 generates opposing diametrically aligned magnetic force vectors in which the vectors pulling the rotor unit RU to the right have a magnitude greater than the force vectors pulling the rotor unit RU to the left. Conversely, the lower portion of the rotor unit RU is displaced to the left when the radial bearing RB2 generate opposing diametrically aligned magnetic vectors in which the vectors pulling the rotor unit to the left have a magnitude greater than those pulling the rotor unit RU to the right.

As shown in both FIGS. 5A and 5B, the rotor unit RU will "tilt" about some tilt or pivot point. If desired, the location of that pivot point can be varied upwardly or downwardly through a selected range by controlling the ratio of the displacement forces applied by the radial bearings RB1 and RB2. For example, when the resultant displacement forces provided, respectively, by the radial bearings RB1 and RB2 are approximately equal (but in opposite directions), the pivot point will be located at or near the mid-point position between the radial bearings. Conversely, the resultant displacement force generated by the lower radial bearing RB2 can be made larger than that of the upper radial bearing RB1 to effectively cause the pivot point to be displaced upward toward the upper radial bearing RB1. As can be appreciated, the ratio of the resultant force vectors can be varied to control the upward or downward displacement of the pivot point prior to and during rotation of the rotor unit RU.

As explained below, when a "one-per-revolution" feature is engaged in the "tilt" mode and the rotor unit RU and the associated force vectors rotated about the principal axis defined between the radial bearings RB1 and RB2, the longitudinal axis $A_x$ of the rotor unit functions as a generatrix circumscribing a conical body of revolution (not specifically shown).

FIGS. 6A–7B are plan views of the radial bearings RB1 and RB2 with each bearing shown in a schematic fashion as having four equispaced poles, each with an individual winding. The poles and their windings have been shown in schematic fashion; in practice, the pole pieces and their windings are differently configured.

Figure 6A:
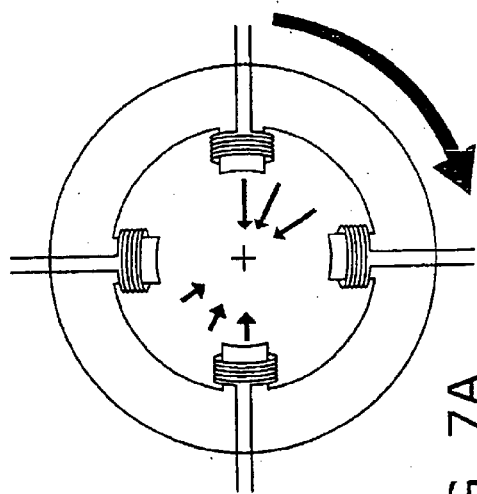
FIGS. 6A and 6B are force vector diagrams, shown in idealized schematic form, of the forces applied to the shaft portion of the rotor assembly by its magnetic bearing to induce the behavior of FIG. 2 and FIGS. 3A and 3B.
Figure 6B:
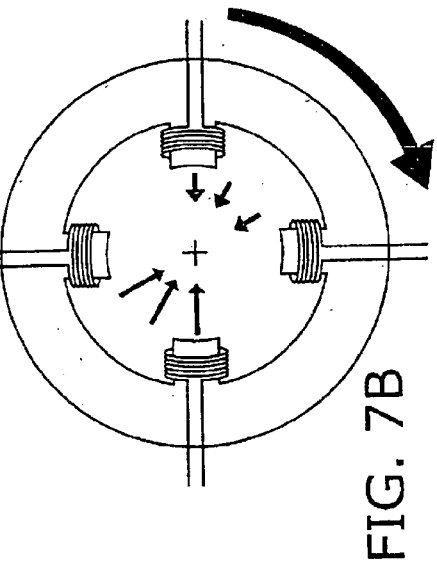

FIGS. 6A and 6B are idealized plan views of the first and second radial bearings in their "bounce" mode taken along lines 6A—6A and 6B—6B of FIG. 3A where the rotor unit RU is rotated in the clockwise direction. As mentioned above, the system is equally functional in the anti-clockwise direction. As shown, the magnetic force vectors are such that the vectors on the right pulling the rotor leftward are larger than the forces on the left pulling the rotor to the right to result in a net resultant leftward shift of the rotor. As represented by the clockwise arrow, the force vectors are rotated in synchronism with the rotor unit RU so that the longitudinal axis $A_x$ of the rotor unit RU will describe a circle about the principal axis defined between the two radial bearings. As explained below, the resultant force vector can be driven by various user-selectable waveforms. Since the forces applied by the first and second radial bearing are substantially equal and synchronized in time, the rotor unit RU will not be subject to nutation.

Figure 7A:
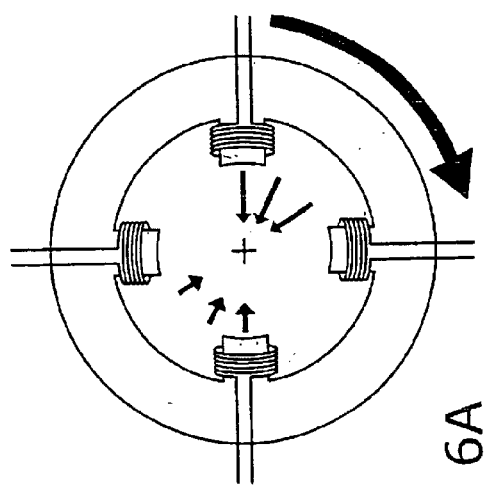
FIGS. 7A and 7B are force vector diagrams, shown in idealized schematic form, of the forces applied to the shaft portion of the rotor assembly by its magnetic bearing to induce the nutation behavior of FIGS. 4A and 4B and FIGS. 5A and 5B.
Figure 7B:
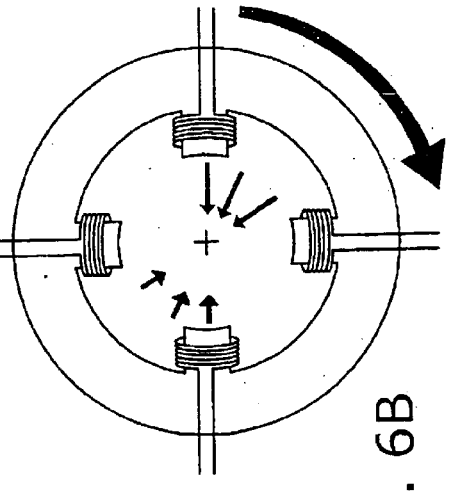

FIGS. 7A and 7B are idealized plan views of the first and second radial bearings in their "tilt" mode taken along lines 7A—7A and 7B—7B of FIG. 5A. As shown and in comparison to the FIGS. 6A and 6B, the magnetic force vectors of the radial bearings RB1 and RB2 are 180° out of phase to create the desired tilt posture of the rotor unit RU and the consequent nutation thereof when the 'one per revolution' mode of operation is engaged.

Figure 8:
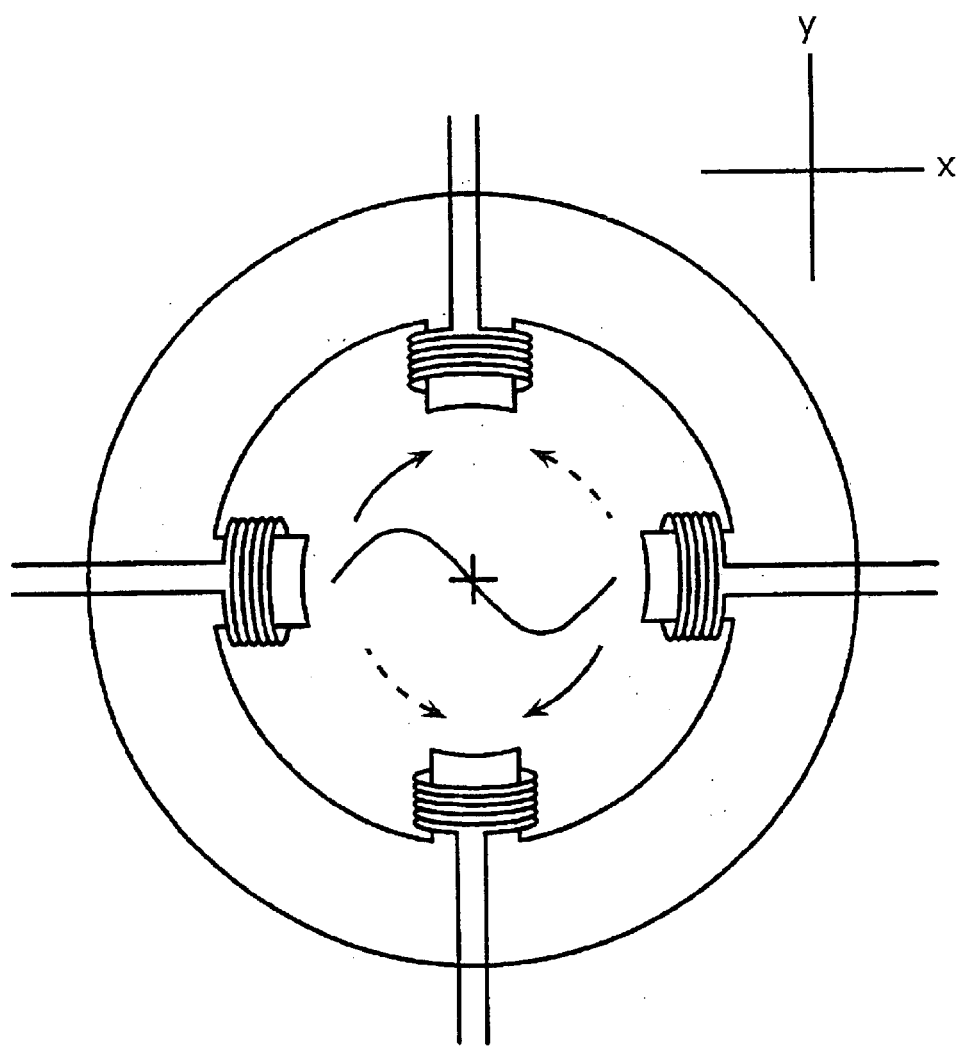
FIG. 8 is plan view of a radial bearing, shown in an idealized schematic form, with a perturbation waveform extending (in a symbolic manner) between two diametrically opposite poles.

FIG. 8 is an idealized plan view of a radial bearing showing an X-Y reference frame. As explained below, perturbation waveforms are impressed on the magnetic field between poles to induce various excitations in the rotor unit RU and a device or devices under test (such as turbine rotor blades) carried by the rotor unit RU. In one operating mode, the waveform (which is shown in an exemplary form as a sine wave) can be established between the poles on the X axis (i.e., 0°). As the rotor unit RU rotates, it will be continuously subjected to the perturbation waveform. In the "one-per-revolution" mode of operation, the waveform is rotated (as indicated by the arrow in FIG. 8) in synchronism with the rotor unit RU. In general, one of a variety of different waveforms can be used (as explained below) in a frequency range of between 0 and 5000 Hz, although a range of 0–900 Hz is most commonly used. When the rotor unit RU is in the "tilt" mode and the "one-per-revolution" option is activated, the rotor unit RU will nutate about its pivot point with each end of the rotor unit revolving or orbiting around the principal axis, the longitudinal axis $A_x$ will describe a conical surface.

Figure 9:
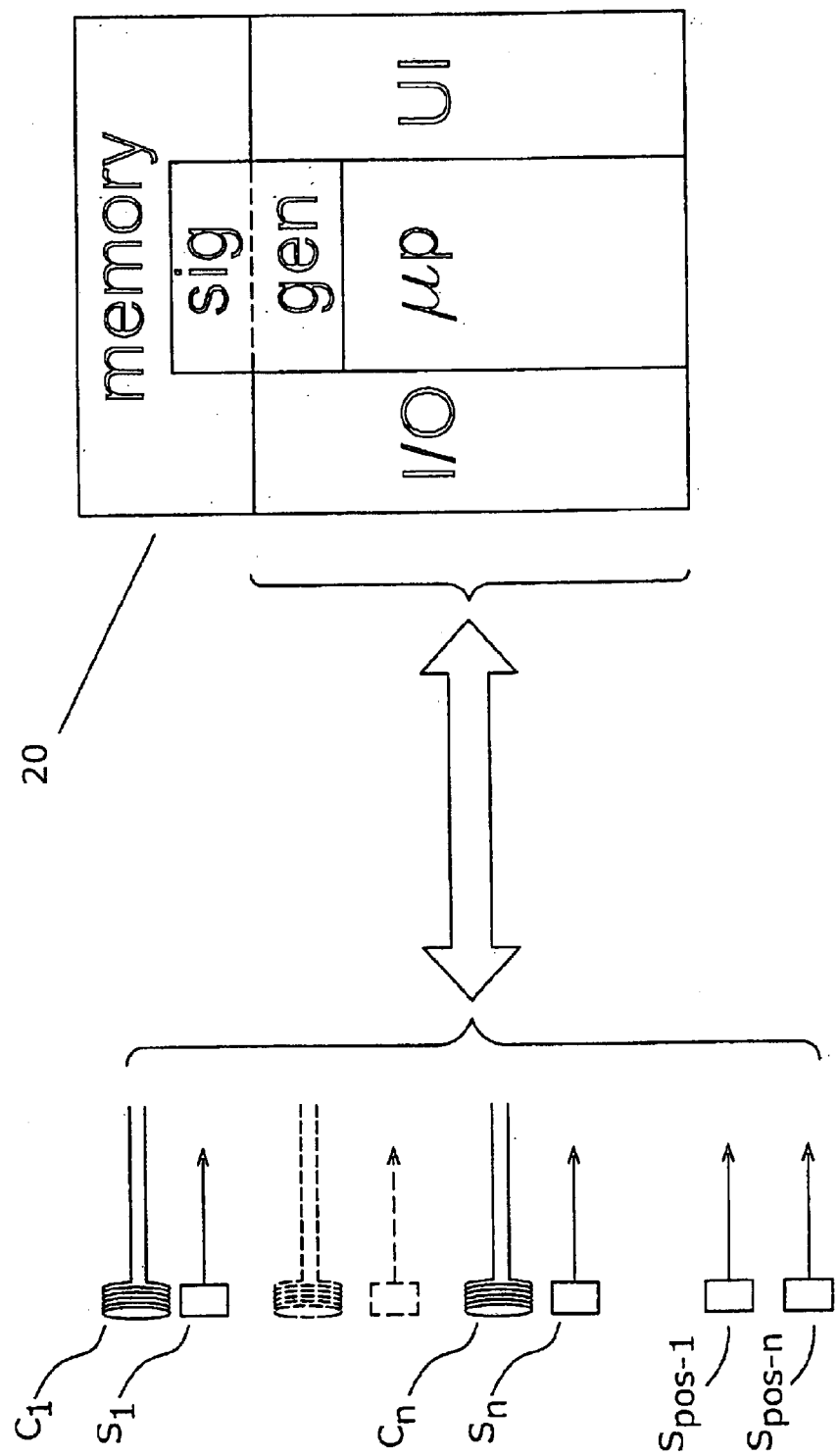
FIG. 9 is a generalized schematic view of a processor-based computer-like controller for controlling the various magnetic bearings that support the rotor assembly.

FIG. 9 is a generalized view of an exemplary computer system 20 for driving the various bearings in accordance with the software routine presented below. As shown, the computer system 20 includes a microprocessor $\mu p$, a user interface UI that can take the form of a conventional keyboard/display, an input/output port, and a memory that contains the software/firmware that is implemented to control motion of the rotor-unit RU. An excitation signal generator block SIGGEN is shown in symbolic form as overlaying a portion of the memory and a portion of the processor. In the preferred embodiment, the computer system 20 is a conventional personal computer using bus-mounted expansion cards to effect the input/output functions. The expansion cards can include voltage and/or current drivers (organized as conventional control channels) that respond to the instructions provided by the microprocessor to control the voltage and/or current to the various windings to thereby control the magnetic fields and related force vectors.

The excitation signal generator SIGGEN functions to generate a multiplicity of excitation waveforms for exciting various vibration modes in the rotor unit RU in the normal, bounce, or the tilt modes. In the preferred embodiment, the various waveforms are generated via Fourier transform instruction-sequences executed in the processor and which loop in a recurring manner to generate the waveforms. Although less preferred; the various waveforms can be stored as digital data in the memory and recalled at varying clock rates to function as the excitation waveform source.

While a computer system organized in a conventional manner has been shown in FIG. 9, other arrangements are equally suitable, including application specific integrated circuits (ASIC) and programmed logic arrays (PLA). The below-described software sequences can be implemented in software or firmware, or a combination thereof. The instructions are preferably implemented in native assembly language although complied C or C++ is suitable as well as a combination thereof. Interpreted languages are not excluded provided the combination of the hardware processor(s) and instruction sequences are sufficiently fast enough to enable a robust levitation and to generate the excitation waveforms commensurate with the highest anticipated revolutions per time unit of the rotor-unit RU.

As shown on the left in FIG. 9, each of the pole windings $C_1 \ldots C_n$ connect to the input/output port and receives time varying voltage/current to generate those force vectors that levitate the rotor unit RU, maintain the rotor unit RU during periods of normal rotation (i.e., when the longitudinal axis $A_x$ of the rotor unit RU is concentric with the principal axis defined between the radial bearings), and establish the desired bounce or tilt alignments while applying the selected excitation waveforms; the waveform excitation can be applied to the rotor unit during rotation and, if desired, while not rotating.

In addition to receiving the input from the rotary position sensor $S_{pos}$, additional sensors include magnetic proximity sensors $S_1 \ldots S_n$ that measure the distance between the sensor and the rotor unit RU to obtain rotor displacement values and/or variations thereof. These sensors typically are mounted in or adjacent the radial bearing units and can take the form of eddy current type sensors or related proximity sensors available from, for example, the Bentley-Nevada Corporation of Minden, Nev. In general, a rotor displacement sensor can be functionally associated with each magnetic pole of the radial bearings to provide displacement information. The output of the respective sensors $S_1 \ldots S_n$ functions as part of a control loop whereby the current/voltage to the windings is adjusted to cause the rotor unit RU to assume a desired position as measured by the sensors. In the case of the preferred embodiment, six sensors are used, two sensors for each radial bearing and two sensors for the thrust bearing. The sensors provide rotor position information via the input/output port of the computer which then uses that information and variations thereof to increase or decrease current to the associated coil(s) to maintain the rotor in the desired alignment. The sensor/winding control system operates throughout the full range of operation of the rotor unit, from a stationary mode (i.e., non-rotating) to the maximum anticipated rotary speed.

Figure 10:
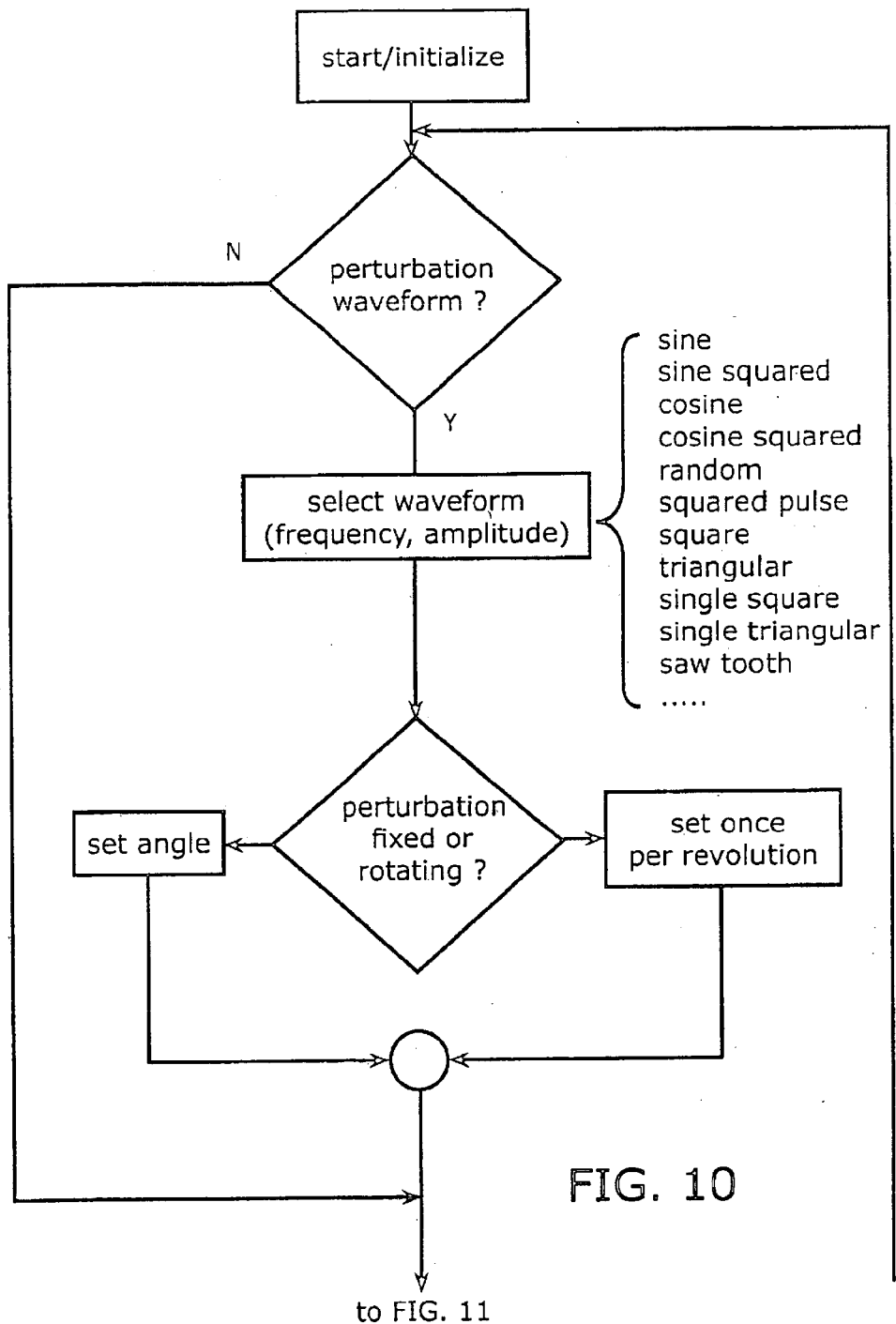
FIGS. 10 and 11 are a representative flow diagram illustrating one possible instruction sequence in accordance with the present invention.
Figure 11:
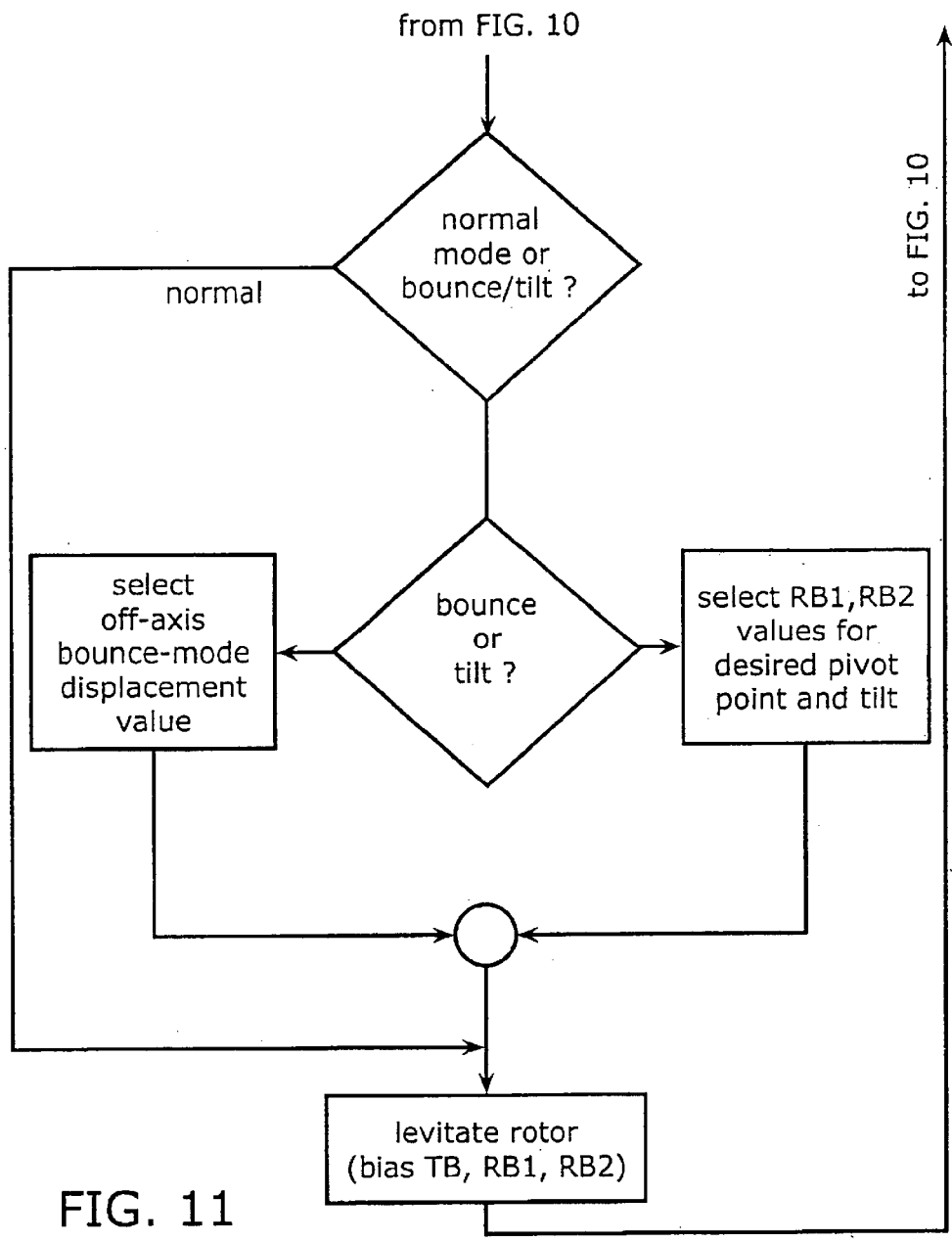
Figure 12:
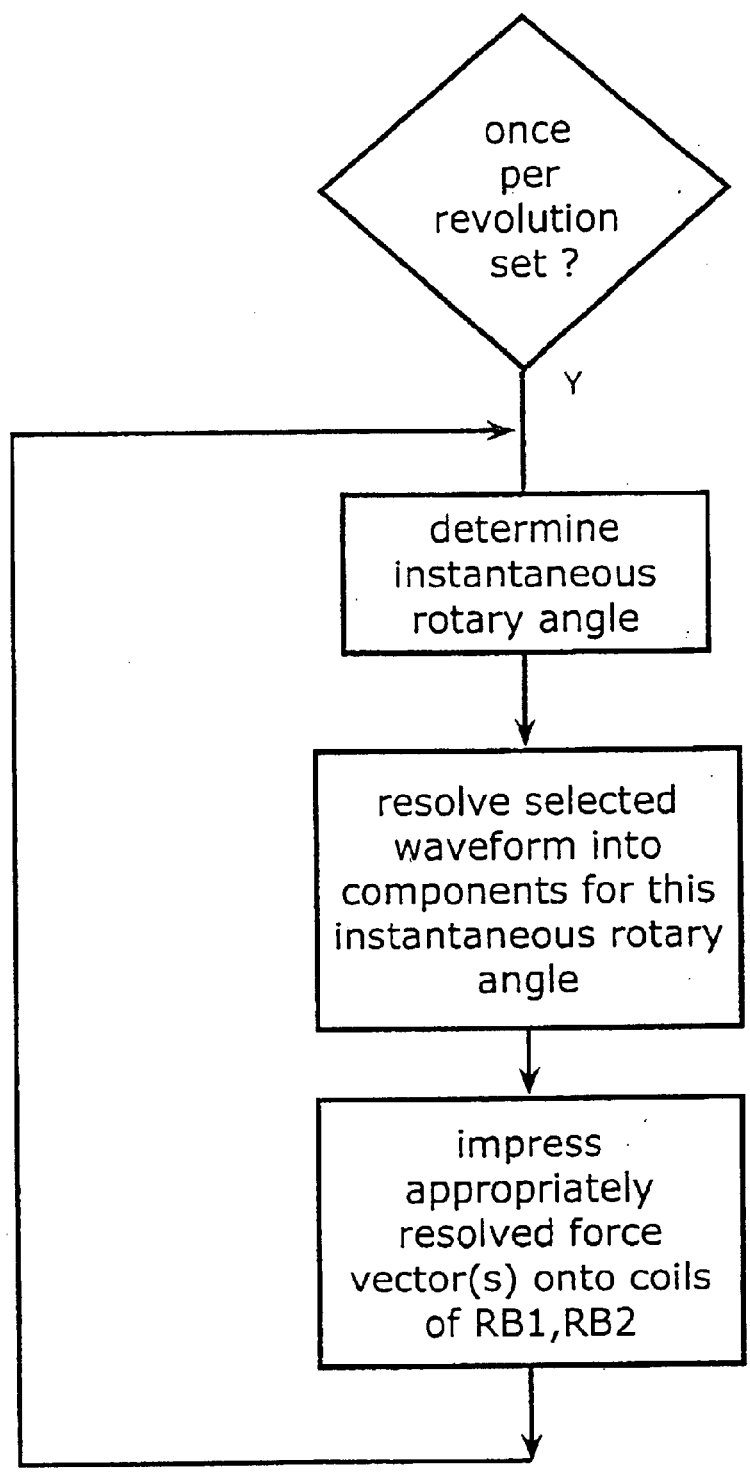
FIG. 12 is a flow diagram illustrating one way in which a perturbing waveform can rotation in synchronism with the rotor.

FIGS. 10, 11, and 12 illustrate an overall block diagram of the control/code sequence of the present invention for implementing the various motions described above and in accordance with one or more selected excitation waveforms.

As shown in FIG. 10, the system is initialized, including the setting or initializing of system variables, etc. Thereafter, a query is presented as to whether or not a perturbation waveform is to be applied. If so, a waveform is selected and a query is presented as to whether or not the selected waveform should be fixed or rotating. If the waveform is to be fixed, the angle of that waveform-driven force vector is selected. For example, the waveform (such as a sine wave or square wave) is applied across the various coil windings of the radial bearing at the selected rotary position relative to some predesignated reference position. Thus and as shown in FIG. 8, a sine wave can be applied at the zero degree position as shown. If a rotating force vector is required, the "one per revolution" flag is set in this case, the waveform-driven force vector rotates with the rotor unit RU, generally at the same rotary speed thereof in either the clockwise or the anti-clockwise direction as desired.

Thereafter and as shown in FIG. 11, a query is presented as to whether the normal mode or a bounce/tilt mode is desired. The normal mode positions the rotor unit RU so that its longitudinal axis $A_x$ is aligned along and coaxial with the principal axis defined between the upper and lower radial bearings RB1 and RB2. If the bounce/tilt option is selected, another query is presented for the choice of the bounce mode or the tilt mode. If the tilt mode is selected, the values corresponding to the tilt force vectors are chosen to define the tilt angle as well as their ratio to position the pivot point. Conversely, if the bounce mode is selected, the values for the off-axis displacement between the longitudinal axis $A_x$ and principal axis defined between the upper and lower radial bearings RB1 and RB2 is selected.

Thereafter, the rotor unit RU is levitated with the program/instruction sequence looping back in a recurring manner to the entry point following the start/initialize block. As can be appreciated, the program execution sequence in FIGS. 10 and 11 can be varied from that shown FIG. 12 illustrates one possible instruction sequence for rotating the perturbation waveform in synchronism with the rotor unit RU. As shown, for each rotary angle of the rotor unit, the selected waveform is resolved into its X,Y components for that angle and the corresponding values provided to the appropriate coil(s) of the radial bearings:

While not specifically shown in the figures, the waveform can be turn-on and off to investigate transient effects on any devices under test.

As will be apparent to those skilled in the art, various changes and modifications may be made to the illustrated rotor control system of the present invention without departing from the spirit and scope of the invention as determined in the appended claims and their legal equivalent.

What is claimed is:

1. Software stored in or on a computer-readable medium for causing a software-controlled processing device coupled to first and second magnetic bearings supporting a rotor to control positioning of the rotor in the first and second magnetic bearings, the rotor having a longitudinal axis and the first and second magnetic bearings defining a principal axis therebetween, each of the first and second magnetic bearings having at least four magnetic poles with respective magnet coils associated therewith, the voltage and/or current flow through the magnet coils generating magnetic field force vectors to support the rotor for rotation relative to the first and second magnetic bearings, the force vectors under the control of the processor to selectively position the longitudinal axis relative to the principal axis, the software causing the processing device to perform the function of:

controlling the force vectors to align the rotor in the first and second magnetic bearings so that the longitudinal axis thereof and the principal axis defined between the first and second magnetic bearings are not axially coincident with one another; and providing a selected waveform to be impressed on the magnetic field of the first and second magnetic bearings to excite the rotor in response to the selected waveform, the waveform impressed on the rotor at a selected angle relative to a fixed reference coordinate system and remaining stationary in that coordinate system during periods of time when the rotor is in motion.

2. The software of claim 1, wherein the longitudinal axis is off-set from the principal axis.

3. The software of claim 1, wherein the longitudinal axis is aligned non-parallel to the principal axis.

4. The software of claim 1, wherein the longitudinal axis is aligned non-parallel to the principal axis and defines a pivot point intermediate the ends of the rotor.

5. The software of claim 4, wherein the position of the pivot point along the longitudinal axis is determined as a function of the ratio of the force vectors applied by the first magnetic bearing and the second magnetic bearing.

6. The software of claim 1, wherein the waveform is selected from the group comprising sine waveform, sine squared waveform, cosine waveform, cosine squared waveform, random waveform, square waveform, squared pulse waveform, triangular waveform, single square waveform, single triangular waveform, sawtooth waveform.

7. Software stored in or on a computer-readable medium for causing a software-controlled processing device coupled to first and second magnetic bearings supporting a rotor to control positioning of the rotor in the first and second magnetic bearings, the rotor having a longitudinal axis and the first and second magnetic bearings defining a principal axis therebetween, each of the first and second magnetic bearings having at least four magnetic poles with respective magnet coils associated therewith, a voltage and/or current flow through the magnet coils generating magnetic field force vectors to support the rotor for rotation relative to the first and second magnetic bearings, the force vectors under the control of the processing device to selectively position the longitudinal axis relative to the principal axis, the software causing the processing device to perform the function of:

controlling the force vectors to align the rotor in the first and second magnetic bearings so that the longitudinal axis thereof and the principal axis defined between the first and second magnetic bearings are not axially coincident with one another; and providing a selected waveform to be impressed on the magnetic field of the first and second magnetic bearings to excite the rotor in response to the selected waveform, the waveform impressed on the rotor at a selected angle relative to a fixed reference coordinate and rotating with the rotor when the rotor is in motion.

8. The software of claim 7, wherein the longitudinal axis is off-set from the principal axis.

9. The software of claim 7, wherein the longitudinal axis is aligned non-parallel to the principal axis.

10. The software of claim 7, wherein the longitudinal axis is aligned non-parallel to the principal axis and defines a pivot point intermediate the ends of the rotor.

11. The software of claim 10, wherein the position of the pivot point along the longitudinal axis is determined as a function of the ratio of the force vectors applied by the first magnetic bearing and the second magnetic bearing.

12. The software of claim 7, wherein the waveform rotates in synchronism with the rotor when the rotor is in motion.

13. The software of claim 7, wherein the waveform is selected from the group comprising sine waveform, sine squared waveform, cosine waveform, cosine squared waveform, random waveform, square waveform, squared pulse waveform, triangular waveform, single square waveform, single triangular waveform, sawtooth waveform.

14. Software stored in or on a computer-readable medium for causing a software-controlled processing device coupled to first and second magnetic bearings supporting a rotor to control positioning of the rotor in the first and second magnetic bearings, the rotor having a longitudinal axis and the first and second magnetic bearings defining a principal axis therebetween, each of the first and second magnetic bearings having at least four magnetic poles with respective magnet coils associated therewith, a voltage and/or current flow through the magnet coils generating magnetic field force vectors to support the rotor for rotation relative to the first and second magnetic bearings, the force vectors under the control of the processing device to selectively position the longitudinal axis relative to the principal axis, the software causing the processing device to perform the function of:

controlling the force vectors to align the rotor in the first and second magnetic bearings so that the longitudinal axis thereof and the principal axis defined between the first and second magnetic bearings are not axially coincident with one another; and providing a selected waveform to be impressed on the magnetic field of the first and second magnetic bearings to excite the rotor in response to the selected waveform, the waveform selected from the group comprising sine waveform, sine squared waveform, cosine waveform, cosine squared waveform, random waveform, square waveform, squared pulse waveform, triangular waveform, single square waveform, single triangular waveform, sawtooth waveform.

15. The software of claim 14, wherein the longitudinal axis is off-set from the principal axis.

16. The software of claim 14, wherein the longitudinal axis is aligned non-parallel to the principal axis.

17. The software of claim 14, wherein the longitudinal axis is aligned non-parallel to the principal axis and defines a pivot point intermediate the ends of the rotor.

18. The software of claim 17, wherein the position of the pivot point along the longitudinal axis is determined as a function of the ratio of the force vectors applied by the first bearing and the second bearing.

* * * * *